US 9,280,256 B1

(12) United States Patent
Pantel et al.

(10) Patent No.: US 9,280,256 B1
(45) Date of Patent: Mar. 8, 2016

(54) SWIRL INTERFACE DISPLAY FOR A HIERARCHICAL ORGANIZATION

(75) Inventors: Christian Robert Pantel, Winnipeg (CA); Scott David Lietzke, Oakland, CA (US); Petros Dermetzis, Alamo, CA (US); Michael Bonadio, Danville, CA (US); Sarah Aubrey Hadley, San Francisco, CA (US); Jason Samuel Boyle, Palo Alto, CA (US)

(73) Assignee: Workday, Inc., Pleasanton, CA (US)

( * ) Notice: Subject to any disclaimer, the term of this patent is extended or adjusted under 35 U.S.C. 154(b) by 540 days.

(21) Appl. No.: 13/209,112

(22) Filed: Aug. 12, 2011

(51) Int. Cl.
*G06F 3/048* (2013.01)
*G06F 3/0481* (2013.01)

(52) U.S. Cl.
CPC .................................. *G06F 3/0481* (2013.01)

(58) Field of Classification Search
USPC ......................................................... 715/853
See application file for complete search history.

(56) References Cited

U.S. PATENT DOCUMENTS

| 5,295,243 | A  | * | 3/1994  | Robertson et al. ............ 715/848 |
| 5,388,196 | A  | * | 2/1995  | Pajak et al. .................. 715/751 |
| 6,879,332 | B2 | * | 4/2005  | Decombe ...................... 715/764 |
| 6,888,554 | B1 | * | 5/2005  | Decombe ...................... 345/645 |
| 7,036,093 | B2 | * | 4/2006  | Decombe ...................... 715/853 |
| 7,043,702 | B2 | * | 5/2006  | Chi et al. ...................... 715/853 |
| 8,028,250 | B2 | * | 9/2011  | Vronay et al. ................. 715/853 |
| 8,185,824 | B1 | * | 5/2012  | Mitchell et al. ............... 715/734 |
| 2008/0307369 | A1 | * | 12/2008 | Liu et al. ....................... 715/855 |
| 2010/0162173 | A1 | * | 6/2010  | Schmitlin et al. ............. 715/853 |
| 2012/0290985 | A1 | * | 11/2012 | Tecarro ........................ 715/841 |

OTHER PUBLICATIONS

Windows 7 File Manager, Dec. 31, 2009, Microsoft, pp. 1-2.*
Jing et al. VisualRank: Applying PageRank to Large-Scale Image Search. IEEE Transactions on Pattern Analysis and Machine Intelligence, vol. 30, No. 11. pp. 1877-1890. Nov. 2008.
Jing et al. Explore Images with Google Image Swirl. Research Blog. Nov. 23, 2009: http://googleresearch.blogspot.com/2009/11/explore-images-with-google-image-swirl.html.

* cited by examiner

*Primary Examiner* — Jennifer To
*Assistant Examiner* — Sunil Sundar
(74) *Attorney, Agent, or Firm* — Van Pelt, Yi & James LLP

(57) ABSTRACT

A system for displaying a hierarchical organization comprises a processor, memory, a data source, and a network interface. The processor is configured to receive an indication of a selected individual and provide a display. The display includes the selected individual within a group represented by a first circle. The display comprises one or more groups in the hierarchy, each represented by one of a set of circles above or below a level of the group that includes the individual. The memory is coupled to the processor and is configured to provide the processor with instructions. The data source comprises detailed information about the hierarchical organization and its members. The network interface is configured to communicate with remote devices requesting displays comprising selected individuals.

16 Claims, 14 Drawing Sheets

SWIRL INTERFACE DISPLAY FOR A HIERARCHICAL ORGANIZATION

BACKGROUND OF THE INVENTION

A hierarchical organization is often displayed by representing the organization as a tree. As the size of the dataset grows, it is difficult to balance showing the details of an individual while maintaining the context of where it is within the hierarchy. All groups must be reduced to fit the tree on the screen, which suppresses important details of the individual or group being examined.

BRIEF DESCRIPTION OF THE DRAWINGS

Various embodiments of the invention are disclosed in the following detailed description and the accompanying drawings.

DETAILED DESCRIPTION

Figure 1:
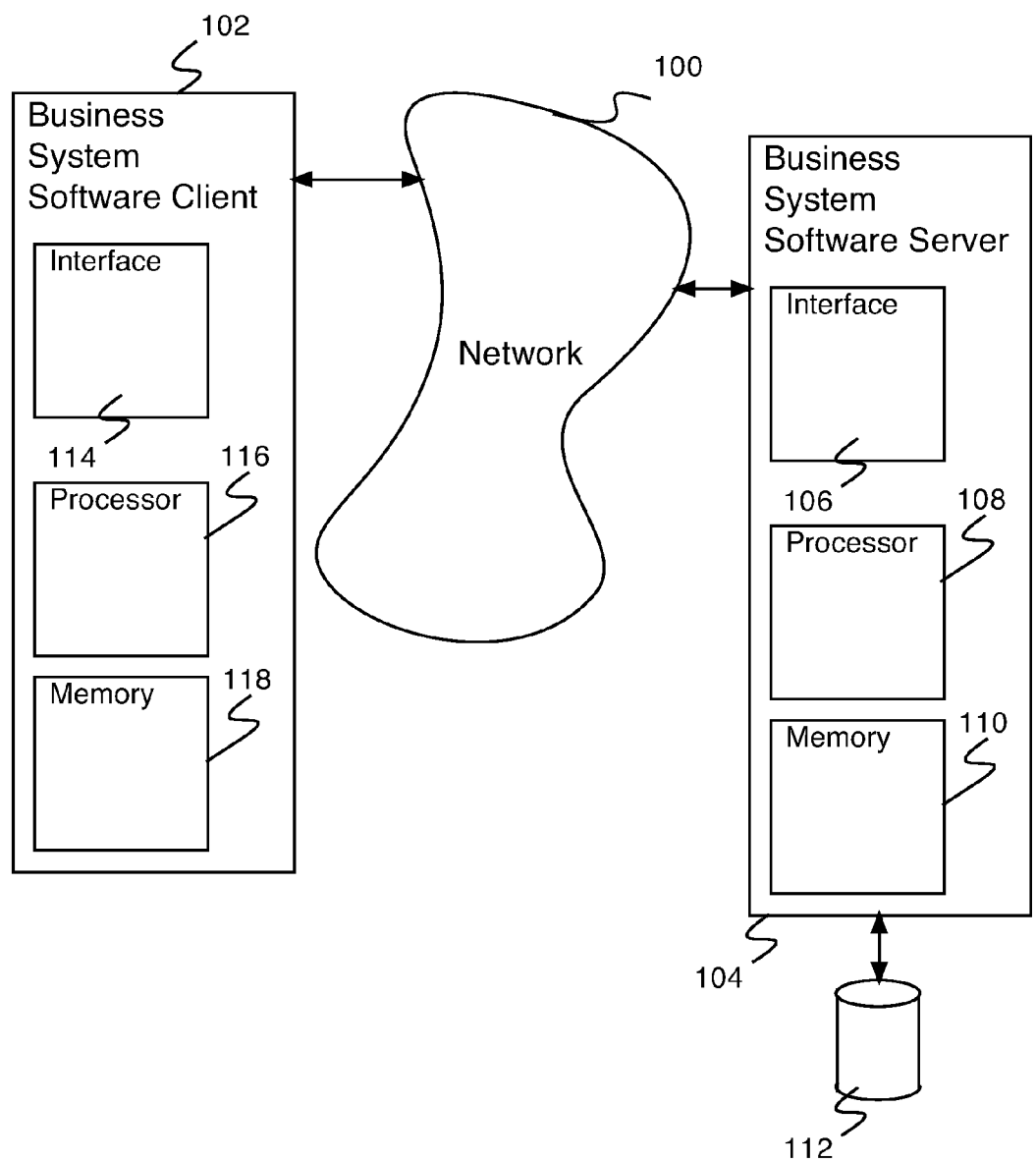
FIG. 1 is a block diagram illustrating an embodiment of a business software server-client system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for displaying a hierarchical organization is disclosed. The system comprises a processor, memory, a data source, and a network interface. The processor is configured to receive an indication of a selected individual and provide a display. The display includes the selected individual within a group represented by a first circle. The display comprises one or more groups in the hierarchy, each represented by one of a set of circles above or below a level of the group that includes the individual. The memory is coupled to the processor and is configured to provide the processor with instructions. The data source comprises detailed information about the hierarchical organization and its members. The network interface is configured to communicate with remote devices requesting displays comprising selected individuals.

In some embodiments, an interface is used to visualize and navigate a hierarchical organization. Detailed information about a member of the organization and its position in the hierarchy is contained in a display showing a series of groups. The display, referred to herein as the "swirl", allows a user to drill down into the lower levels of the hierarchy to see detailed information about a member or a group while providing the context of the groups above. A group has a head and a set of peers (e.g., a team of employees and their supervisor). Each group is linked to the group above it containing the head, its peers, and its head. The lowest group on the swirl display is referred to as having "focus". The user may select a member of the group or the group itself to access information and metrics associated with the individual or the group. Any group or individual may be selected to have focus. In various embodiments, individuals of a group are referred to as one of the following: an individual, a member, a peer, an employee, a worker, or any other appropriate designation for the situation of an individual in a group. In various embodiments, a group is referred to as a group, a set, an organization, a department, a division, a section, or any other appropriate term for a group. In various embodiments, the head of a group is referred to as a head, a leader, a boss, a supervisor, a manager, or any other appropriate term for a head of a group.

FIG. 1 is a block diagram illustrating an embodiment of a business software server-client system. In the example shown, business system software server 104 includes interface 106, processor 108 and memory 110. Business system software server 104 is coupled to external storage 112 so that business system software server 104 is able to store information to and access information from external storage 112. Network 100 is a communication network. In various embodiments, network 100 comprises a local area network, a wide area network, the Internet, a wired network, a wireless network or any other appropriate communication network. Business system software client 102 includes interface 114, processor 116, and memory 118. Business system software client 102 accesses network 100 through interface 114. In some embodiments, business system software client 102 accesses an application running on business system software server 104. The application provides displays based on stored data. In various embodiments, stored data is related to a business requirement such as a personnel file, data related to an employee, sales data, or any other relevant data. In various embodiments, the server comprises an enterprise application, a human resources application, a finance application, a content management application or any other appropriate application.

In various embodiments, business system software server 104 comprises one or more physical servers with one or more processors, one or more memories, and one or more other storage devices (e.g., hard drives, array of drives, etc.) and/or one or more virtual environments (e.g., virtualization of operating system or application processes) in which an application is executed.

Figure 2:
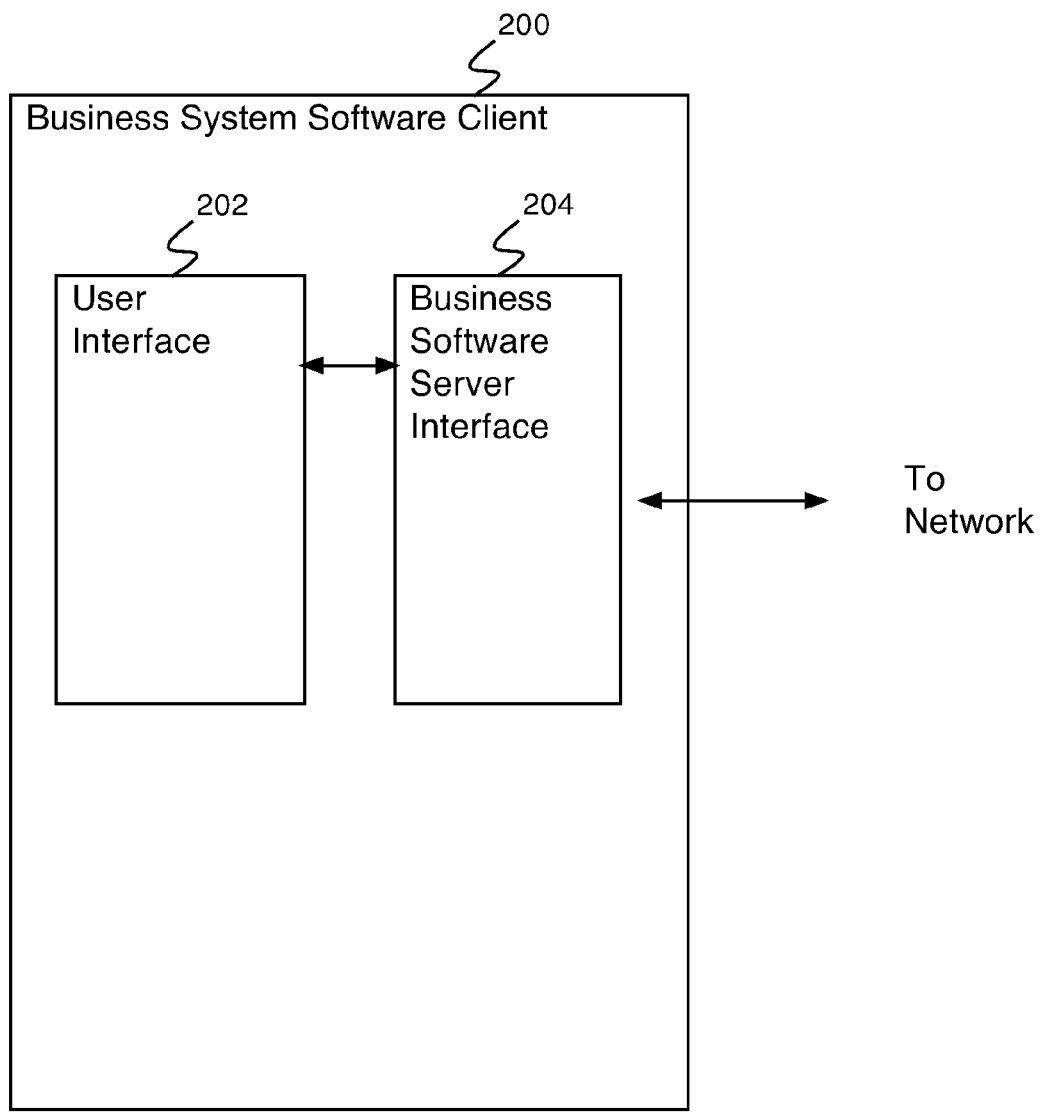
FIG. 2 is a block diagram illustrating an embodiment of a business system software client.

FIG. 2 is a block diagram illustrating an embodiment of a business system software client. In some embodiments, business system software client 200 is used to implement business system software client 102 of FIG. 1. In the example shown, business system software client 200 includes a user interface 202 and a business software server interface 204, which communicates with other devices on a network. In some embodiments, business system software client 200 receives user input through user interface 202 which passes the input to business system server interface 204 that in turn passes the received input to a network. For example, a user initiates a search for a person in an organization. The business system software client 200 receives data and display information to enable displaying a swirl, where the swirl enables easy visualization and navigation of a hierarchical organization.

Figure 3:
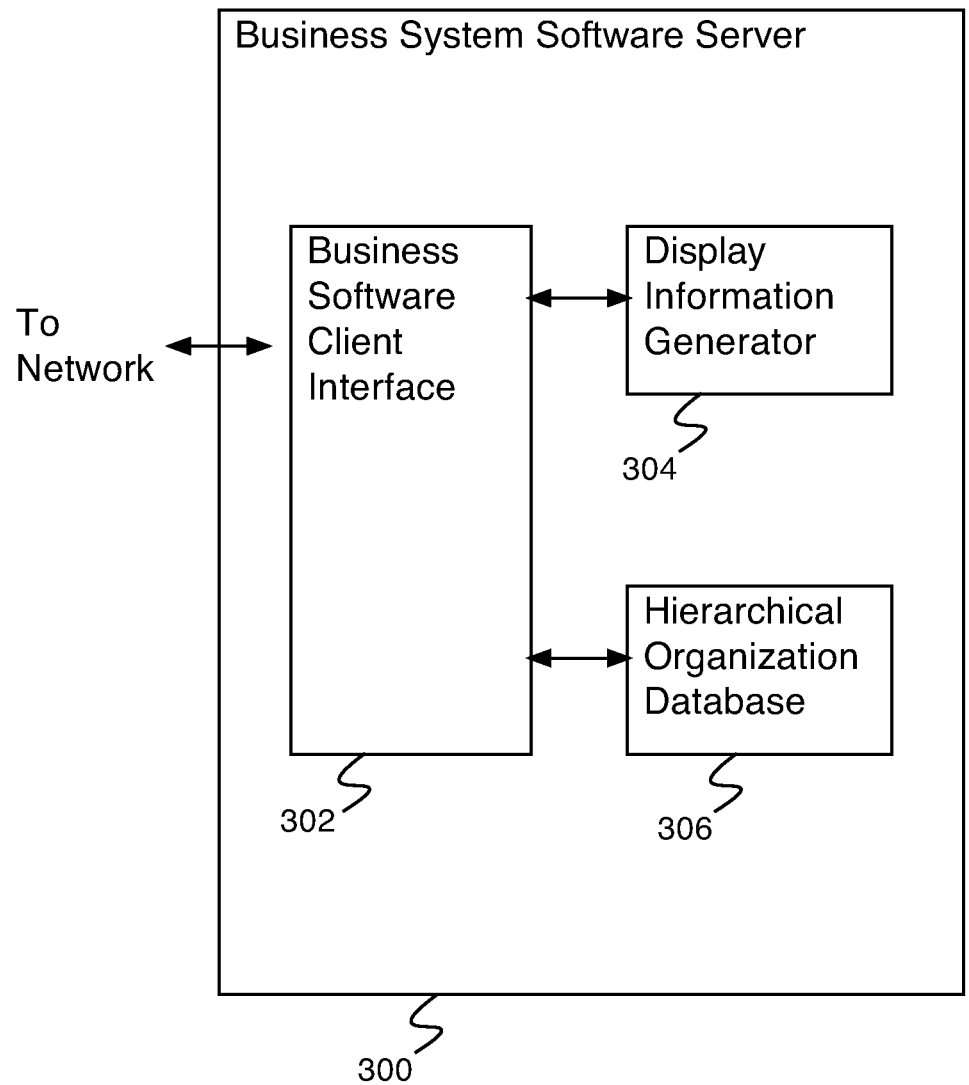
FIG. 3 is a block diagram illustrating an embodiment of a business system software server.

FIG. 3 is a block diagram illustrating an embodiment of a business system software server. In some embodiments, business system software server 300 is used to implement business system software server 104 of FIG. 1. In the example shown, business system software server 300 includes a business software client interface 302, a method to create display information 304, and a database containing information about hierarchical organization 306. In various embodiments, business system software server 300 receives an indication of a selected individual or group from a device on a network. Business system software server accesses hierarchical organization database 306 for relevant data and uses display information generator 304 to create a display to provide data and display information to the network device that initiated the request. Typical information includes a display of other members of the individual's group, the supervisor of the group, and a display of groups leading up to the head of the organization. For example, if a selected individual is a vice president of sales for North America, the group might include the vice presidents of sales for other geographic regions, and the head could be the executive vice president of sales. The head would be linked to another group containing his peers, including the executive vice president of marketing and the executive vice president of manufacturing. All of the linked groups would be displayed up to the overall head of the organization.

Figure 4:
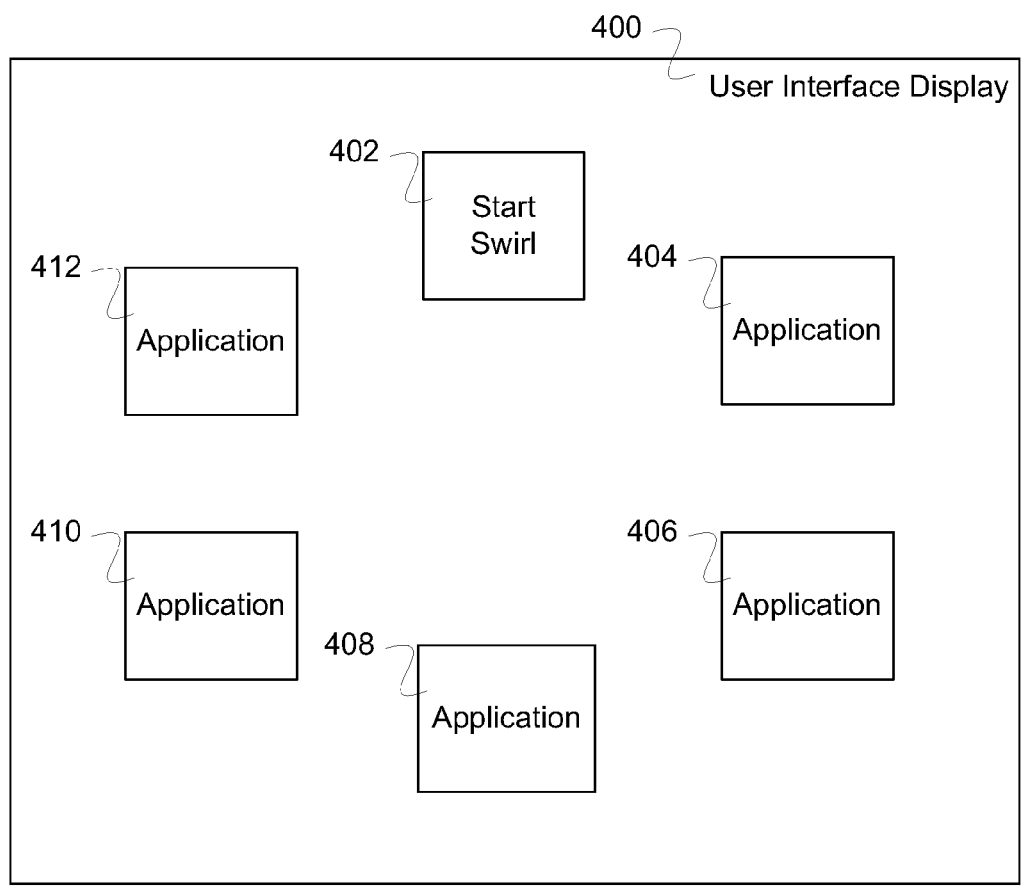
FIG. 4 is a block diagram illustrating an embodiment of a display.

FIG. 4 is a block diagram illustrating an embodiment of a display. In some embodiments, the display of FIG. 4 is caused to appear to a user using business system software client 102 of FIG. 1. In the example shown, user interface display 400 shows a plurality of icons to a user—for example, start swirl 402, application icon 404, application icon 406, application icon 408, application icon 410, and application icon 412. In the event that start swirl 402 is selected, a tool or application for displaying and navigating a hierarchical organization is started. The tool uses a series of circles to display portions of the hierarchical organization showing relations between the members in the hierarchy. Application icon 404, application icon 406, application icon 408, application icon 410, and application icon 412 represent other functionality for a user that can be selected—for example, an application regarding compensation and benefits, an application regarding financials, an application regarding talent management, an application regarding workforce planning, or any other appropriate application or tool useful for a user. In some embodiments, start swirl 402 application shows a window for searching for a member of a hierarchical organization. In some embodiments, start swirl 402 application shows a window displaying members previously searched for. In some embodiments, details regarding the member are displayed in a window prior to displaying the member within a hierarchical organization (e.g., a name, a title, an address, a phone number, an email address, etc.).

Figure 5:
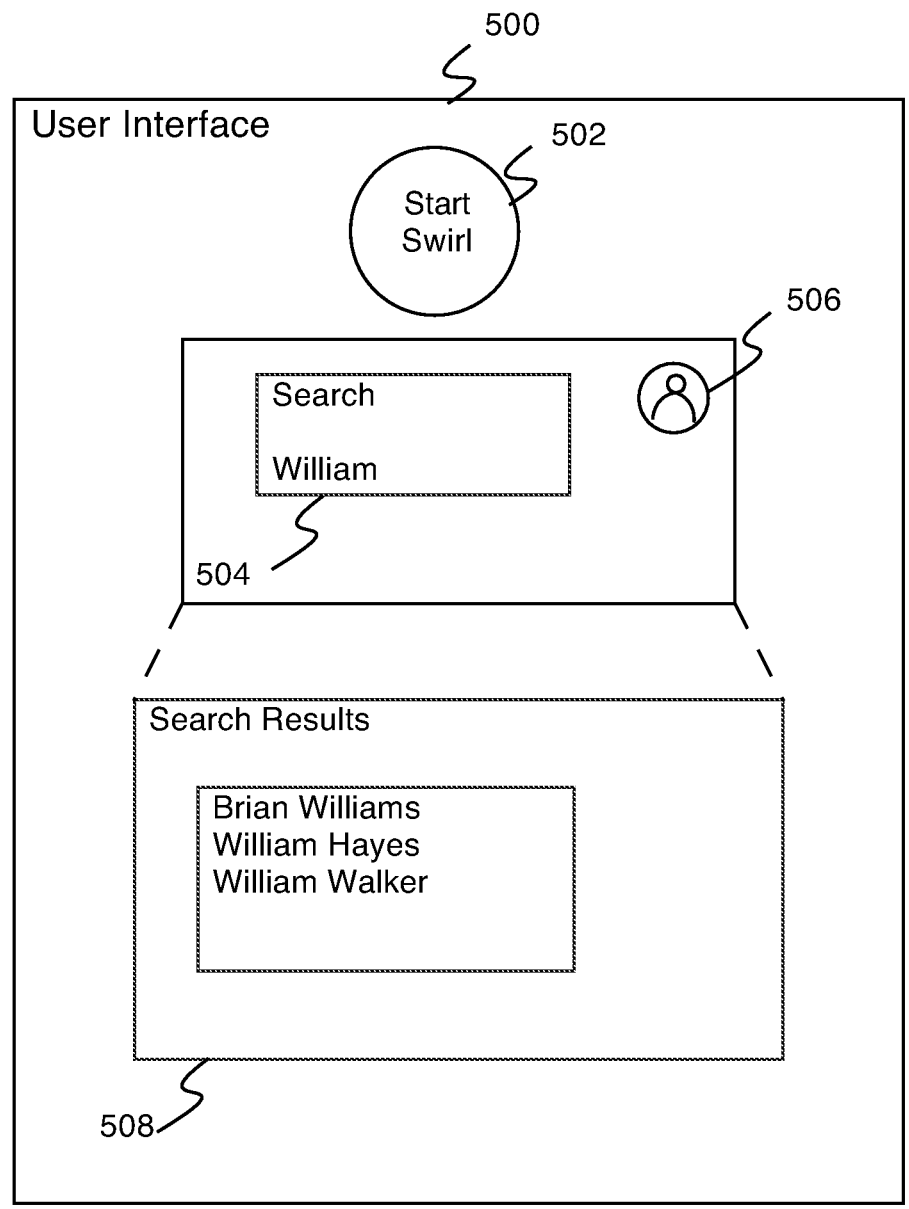
FIG. 5 is a block diagram illustrating an embodiment of a display.

FIG. 5 is a block diagram illustrating an embodiment of a display. In some embodiments, the display of FIG. 5 is caused to appear to a user using business system software client 102 of FIG. 1. In the example shown, user interface display 500 shows search prompt 504 and user data icon 506 after swirl 502 has been selected by the user. In the event that text is entered in search field 504 and a search is run, any results from the search are displayed in results list 508. The user may select a result from results list 508, or the user may choose to view data associated with the user account by selecting user data icon 506. Either selection will cause a swirl to be displayed. User data icon 506 is represented by a person, but in various embodiments, it is represented by a question mark, a pair of eyeglasses, or any other appropriate image or text.

Figure 6:
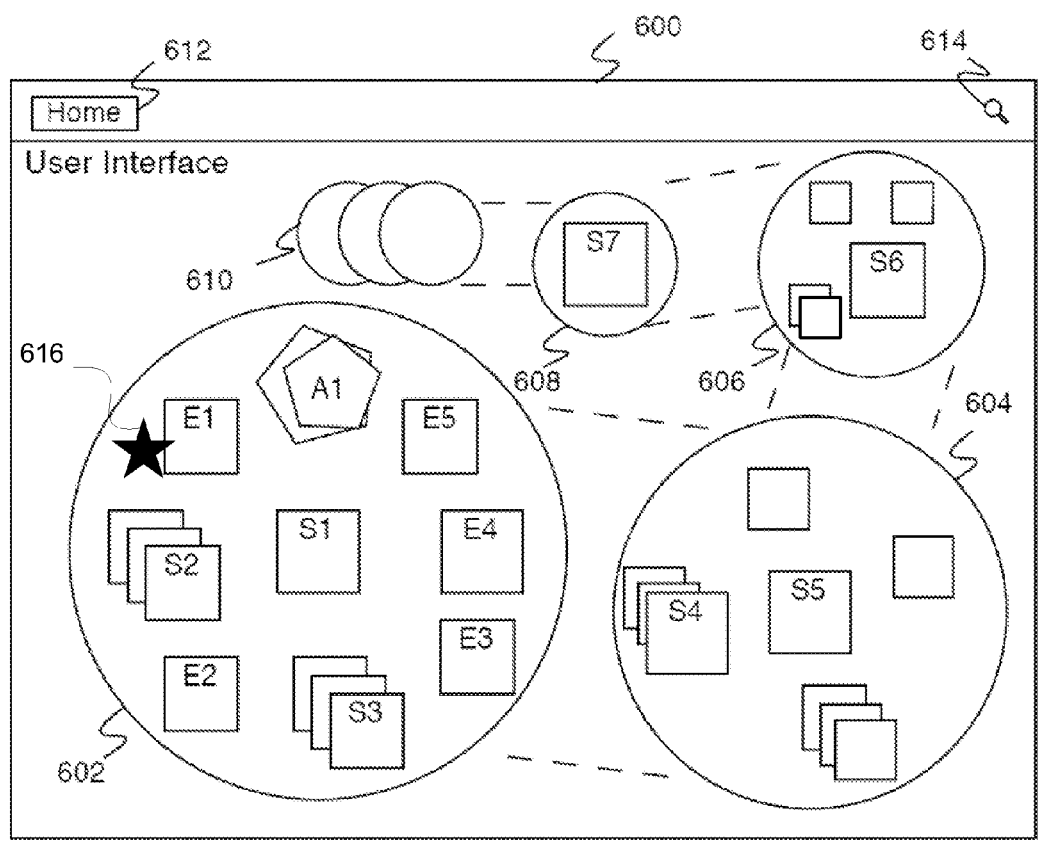
FIG. 6 is a block diagram illustrating an embodiment of a display.

FIG. 6 is a block diagram illustrating an embodiment of a display. In some embodiments, the display of FIG. 6 is caused to appear to a user using a business system software client 102 of FIG. 1. In the example shown, user interface display 600 shows a swirl where member E1 has been selected. In various embodiments, the selected member (e.g., E1) is designated using star 616, a pin, a colored outline, a darker outline, a flashing icon, or any other appropriate manner of designating a selected member. Group 602 has focus in user interface display 600. S1 is at the middle of group 602, indicating that S1 is the head of group 602 and the rest of the individuals (e.g., E1, E2, E3, E4, E5, S2, S3, and A1) are members of group 602. In some embodiment, the icons of stacked rectangles indicate that S2 and S3 are supervisors of groups. S1 is a member of group 604, which is headed by S5. S5 is a member of group 606, which is headed by S6. S6 is a member of group 608, which is headed by S7. The top-level group of the organization is group 610. In some embodiments, group 608 has at least one additional rectangle in it that represents S6. In this embodiment, all groups that are more than four levels above the group in focus are collapsed and the members are hidden. Any group may be selected to give it focus, allowing the user to select an individual within it, or select the group itself. Selecting a stacked rectangles icon at any level brings the group led by the corresponding supervisor directly into focus. If an individual or a group is selected, a display with detailed information is provided. In some embodiments, the members of the groups are employees and the head of the group is their boss. In some embodiments, the members of groups are items in a bill of material and the head of the group is the item itself. In some embodiments, the members of groups are categories of material in inventory and the head of the group is the over-arching category. In some embodiments, it is possible for one person to be a supervisor of more than one group of the organization, in which case they are not necessarily a member of the parent group.

The top bar of user interface display 600 contains navigation button 612 and search icon 614. In some embodiments, the top navigation bar is shown in other displays of the swirl. In various embodiments, navigation button 612 returns the user to user interface display 400, or to detailed information of the last individual that was viewed. When search icon 614 is selected, and a new swirl may be initiated starting with a result of the search. In various embodiments, search icon 614 is represented by a question mark, a pair of eyeglasses, or any other appropriate image or text.

Some groups may have more individuals than can be displayed clearly within user interface display 600. In some embodiments, the stacked set of polygons A1 indicates there are more individuals in group 602. In various embodiments, additional individuals are indicated with icons of different colors, shapes or any other appropriate image or text. Selecting A1 causes a blow up display to be generated. In some embodiments, in the event that the selected individual searched for is a member of a large group or organization, the display of the individual needs to be shown directly in the swirl and not hidden behind a set of polygons (e.g., like A1). In some embodiments, the priority order for determining which individuals to show directly in the swirl is first the selected individual searched, second the supervisors in alphabetical order, third the non-supervisors in alphabetical order.

In some embodiments, text is added to the edge of a circle to identify the name of a group. In various embodiments, text is added within the circle to identify a member name, a member title, or any other appropriate information.

Figure 7:
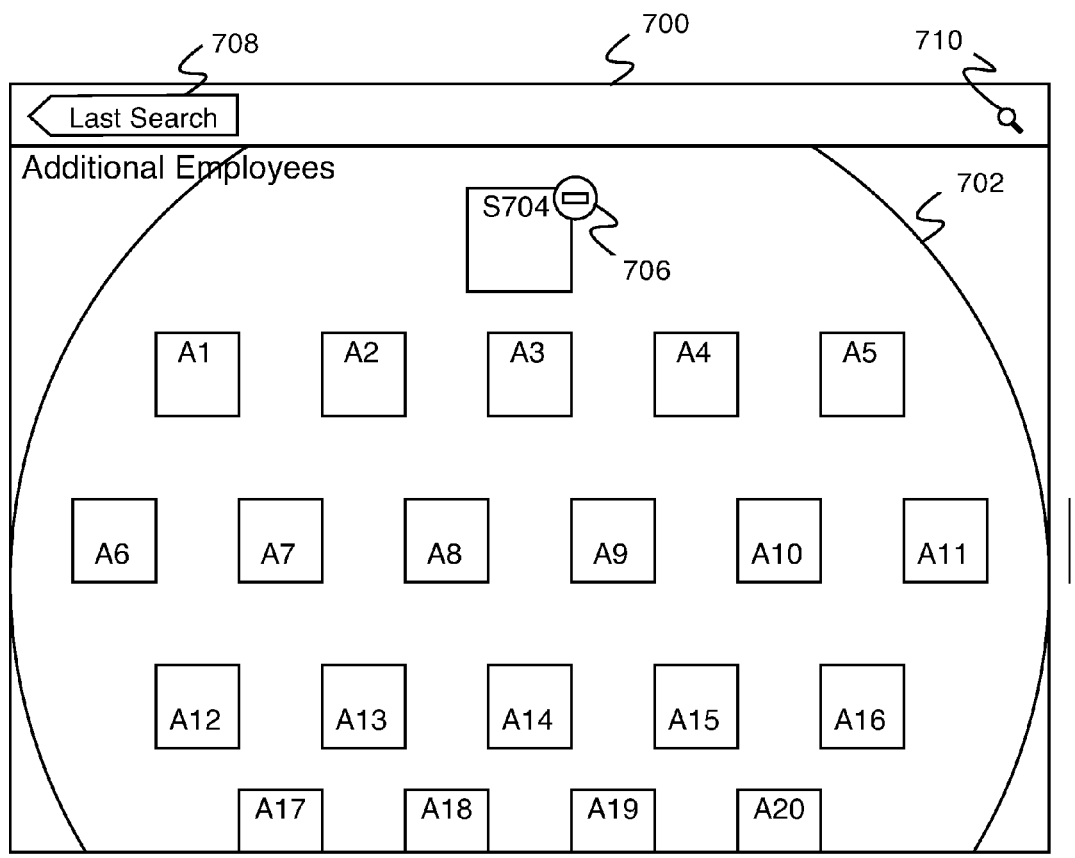
FIG. 7 is a block diagram illustrating an embodiment of a user interface blow up display.

FIG. 7 is a block diagram illustrating an embodiment of a user interface blow up display. In some embodiments, user interface display 700 is caused to appear to a user using a business system software client 102 of FIG. 1. In some embodiments, user interface display 700 is used to show a blow up for A1 of FIG. 6. In the example shown, S704 is the supervisor for group 702. All of the members of group 702 are shown in circle 702. In some embodiments, the members occupy off-screen areas of circle 702, in which case the user is able to drag the circle around to display on-screen the members in the formerly off-screen areas. In some embodiments, S704 is anchored in place in the display and the remaining members (e.g., A1 through A20 are presented in a tile layout that can be scrolled through. Selection of icon 706 reduces group 702 to a small size and the user is shown a display like in FIG. 6.

The top bar of user interface display 700 includes navigation button 708 and search icon 710. In this example, navigation button 708 returns the user to the detailed information of the last individual that was viewed. When search icon 710 is selected, a new swirl is initiated starting with a result of the search.

Figure 8:
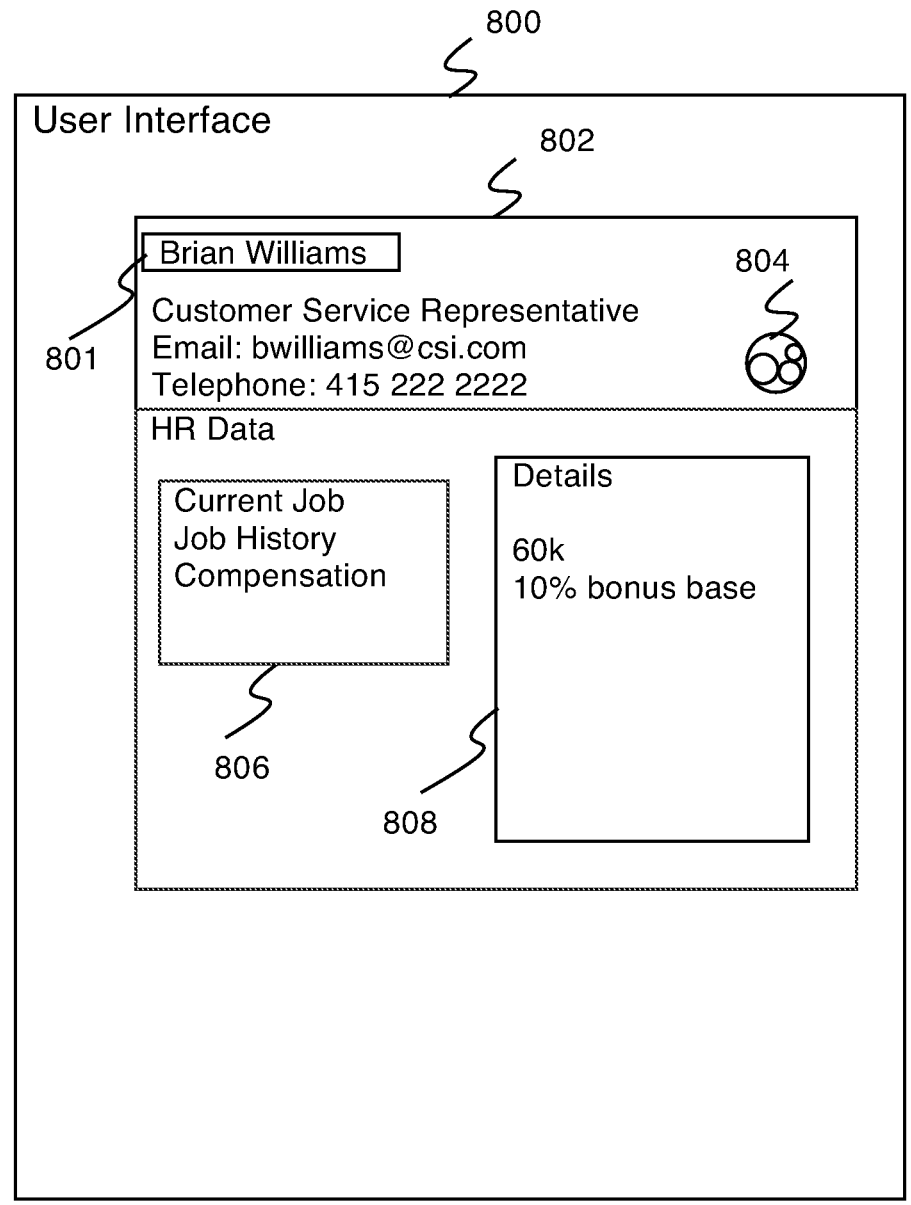
FIG. 8 is a block diagram illustrating an embodiment of a display.

FIG. 8 is a block diagram illustrating an embodiment of a display. In some embodiments, the display of FIG. 8 is caused to appear to a user using a business system software client 102 of FIG. 1. In the example shown, user interface display 800 shows detailed information associated with individual 801 (e.g., Brian Williams). User interface display 800 shows employee individual 801 and detailed information 802, where detailed information 802 shows a title (e.g., customer service representative), email address (e.g., bwilliams@csi.com), and a telephone number (e.g., 415-222-2222). In some embodiments, other detailed information is displayed—for example, office location, address, photograph, or any other appropriate detailed information. A set of categories of HR Data is shown—for example, categories 806 (e.g., current job, job history, compensation, etc.) and details 808 (e.g., 60 k and 10% bonus base as examples of category compensation). In some embodiments, a similar screen shows detailed information associated with a group. In the event icon 804 is selected, a swirl is caused to be displayed with the group in focus containing individual 801. In various embodiments, the detailed information comprises an employee's sales performance data, both individual and relative to his team or other teams, an employee's budget, or his team's budget, or any other appropriate group related or individual detailed information. In various embodiments, details comprise charts, text, a performance review, a time associated with a person, attendance associated with a person, a succession plan associated with a person, or any other appropriate detail. In some embodiments, the detail is with regard to a bill of materials, where the detail comprises the availability of the item, the preferred supplier of the item, or any other appropriate detail.

Figure 9:
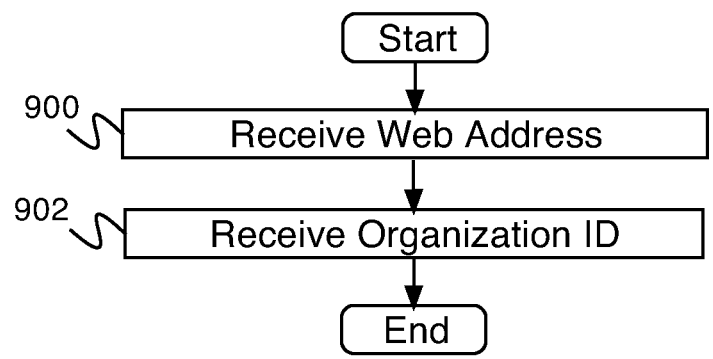
FIG. 9 is a flow chart illustrating an embodiment of a registration process.

FIG. 9 is a flow chart illustrating an embodiment of a registration process. In the example shown in 900, a web address is received. For example, a business system software server receives a network address from a business system software client. In 902, an organization identifier is received. For example, a business system software server receives an organization identifier (ID) and links the data associated with the organization ID to the network address sent in 900. All data and displays sent to the network address in 900 use data associated with the organization ID in 902. In some embodiments, only data from one organization is accessible by a business system software client without repeating the registration process. In some embodiments, other business system software clients could register with a separate network address and a separate organization ID and access data for other organizations concurrently. In some embodiments, two separate business system software clients could register with different network addresses and identical organization ID's and access the same data concurrently.

Figure 10:
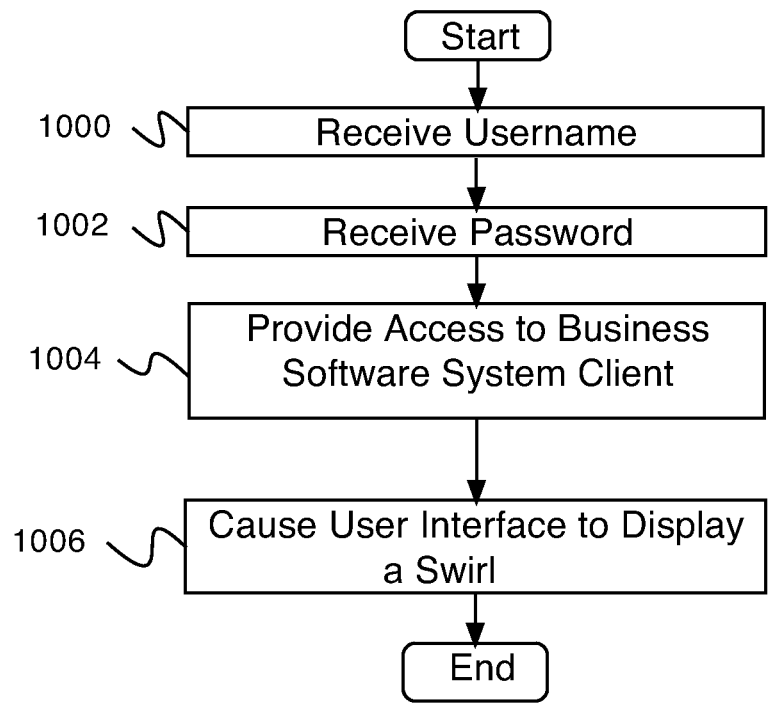
FIG. 10 is a flow chart illustrating an embodiment of a login process of a business system software client.

FIG. 10 is a flow chart illustrating an embodiment of a login process of a business system software client. In some embodiments, the login process is implemented by business system software server 104 of FIG. 1. In the example shown, in 1000 a username is received. For example, the username is provided by a user entering the name for logging in from a business system software client. In 1002, a password is received. In 1004, access is provided to the business system software client. For example, a business system software server validates the user based on the username and the password and provides access to a user using the business system software client to the business system software server. In 1006, a user interface is caused to display a swirl. For example, the business system software provides display information to the business system software client to cause the display to show a swirl.

Figure 11:
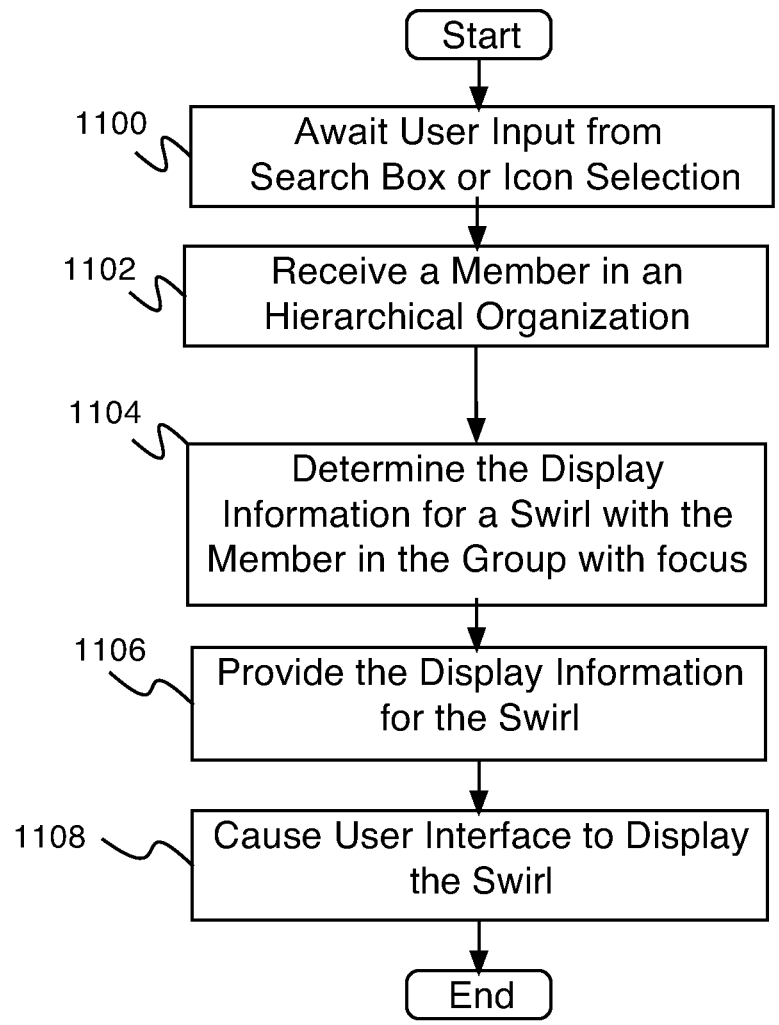
FIG. 11 is a flow chart illustrating an embodiment of an initialization process of a swirl display.

FIG. 11 is a flow chart illustrating an embodiment of an initialization process of a swirl display. In some embodiments, the initialization is initiated by a user selecting a start swirl circle—for example, start swirl circle 402 of FIG. 4. In the example shown, in 1100, user input is awaited from a search box or from selection of an icon. In 1102, a member in a hierarchical organization is received. In 1104, the display information is determined with the member in a group with focus. For example, a member is displayed within a circle where group members are also displayed within the circle and the circle is the main display—or the focus. A head of the group is displayed in the center of the circle. Other circles are displayed higher up in the organization, where the circle above the focus includes the head of the group in the focus circle as a member. In 1106, the display information for a swirl is provided.

Figure 12:
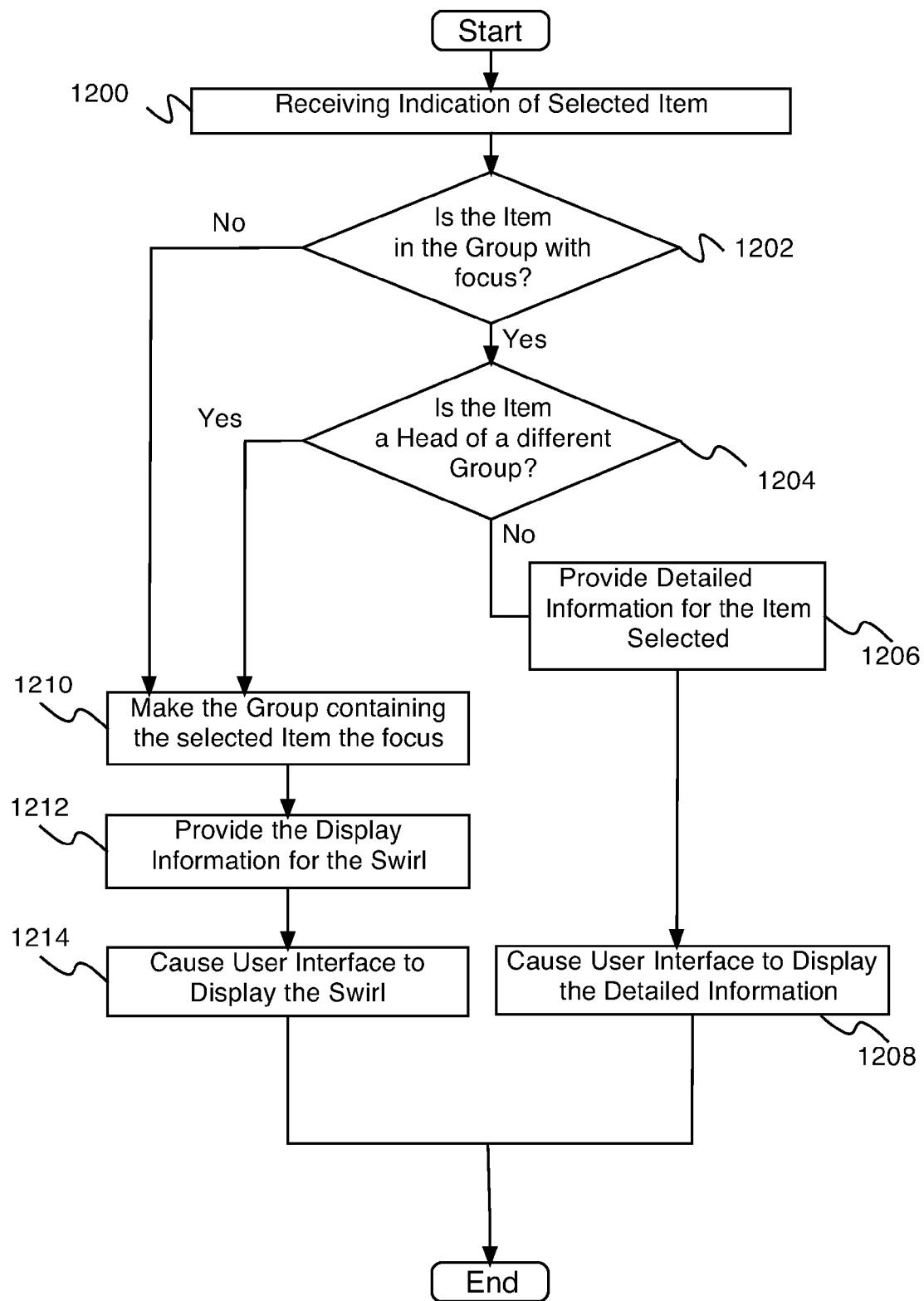
FIG. 12 is a flow chart illustrating an embodiment of a process for updating a swirl display after the user has selected a new item in the current display.

FIG. 12 is a flow chart illustrating an embodiment of a process for updating a swirl display after the user has selected a new item in the current display. In the example shown, in 1200 an indication of a selected item is received. For example, the user selects a member of a group or a group itself to make the focus of the swirl by clicking, choosing from a list, or any other appropriate selection. In 1202, it is determined whether the item is in the group with focus. For example, it is determined whether the selected item is a member of or the head of the group with focus. In the event that the item is not in the group with focus, then control passes to 1210. In 1210, the group containing the selected item is made the focus. In 1212, display information is provided for the swirl. In 1214, the user interface is caused to display the swirl. In the event that the item is in the group with focus. In 1204, it is determined whether the item is the head of a different group. For example, it is determined whether the selected item is the head of a group that is not the group with focus. In the event that the item is the head of a different group, then control passes to 1210. In the event that the item is not the head of a different group, then control passes to 1206. In 1206, detailed information is provided for the item selected. In 1208, the user interface is caused to display the detailed information. In this embodiment, the member of a group is an employee and the detailed information is a set of data relevant to human resources management.

Figure 13:
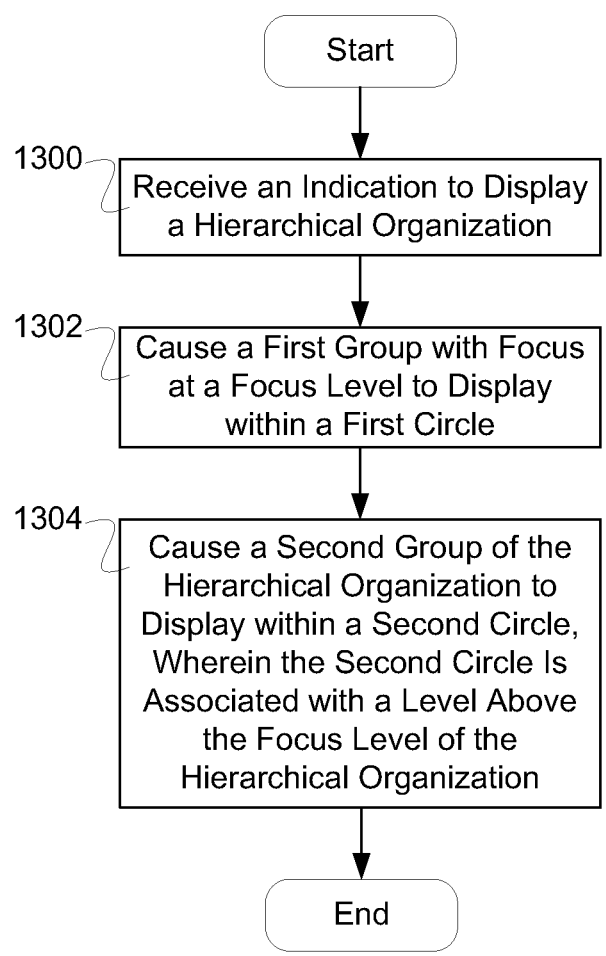
FIG. 13 is a flow diagram illustrating an embodiment of a process for displaying a hierarchical organization.

FIG. 13 is a flow diagram illustrating an embodiment of a process for displaying a hierarchical organization. In the example shown, in 1300 an indication is received to display a hierarchical organization. For example, the indication comprises a click on a swirl icon, an activation of a display application, a click on a search icon, an indication to display a member of a group, an indication to display a group, an indication to display detailed information of a member of a group, an indication to display a group, or any other appropriate indication. In 1302, a first group with focus at a focus level is caused to be displayed within a first circle. For example, a top level of the hierarchy is caused to be displayed (e.g., when the organization is indicated to be displayed), a selected group (e.g., where a user indicated the selected member of a selected group is to be displayed of a hierarchical organization), an associated group or a desired group where the associated group or the desired group are associated with a request to search a hierarchical organization, or any other appropriate group. In 1304, a second group of the hierarchical organization is caused to be displayed within a second circle, wherein the second circle is associated with a level above the focus level of the hierarchical organization. For example, the head of the first group comprises a member of the second group.

In some embodiments, a hierarchical organization is displayed using a series of circles that makes navigation more intuitive. A user indicates a display of the organization is desired. For example, an indication comprises starting an application that displays the organization. The application prompts for a search. In some embodiments, the search is for a person who is a member of a group, and the application displays the group as the focus (with the member displayed) within the hierarchical organization. In some embodiments, the search is for a group, and the application displays the group as focus within the hierarchical organization. The group as the focus is displayed with higher groups (e.g., a group with the head of the group with focus as a member and even higher level groups in the hierarchy). The user can also click on a group or a member of a group and get more detailed information of the group or the member of the group, respectively. In some embodiments, the groups higher than the group with focus are displayed with all the members and the head at the center or with just the head or with just a circle. The user can also click on a member of a group who is the head of another group and the display of that group is then displayed with the member at the center of the circle. In some embodiments, in the event that there are too many members of a group to display within a circle entirely visible on the display, the circle is made larger than the display and the user can navigate within the circle to see all the members. In some embodiments, the head of the group with too many members of a group to display within a circle entirely visible on the display, the head is positioned to display at the top of the circle.

Figure 14:
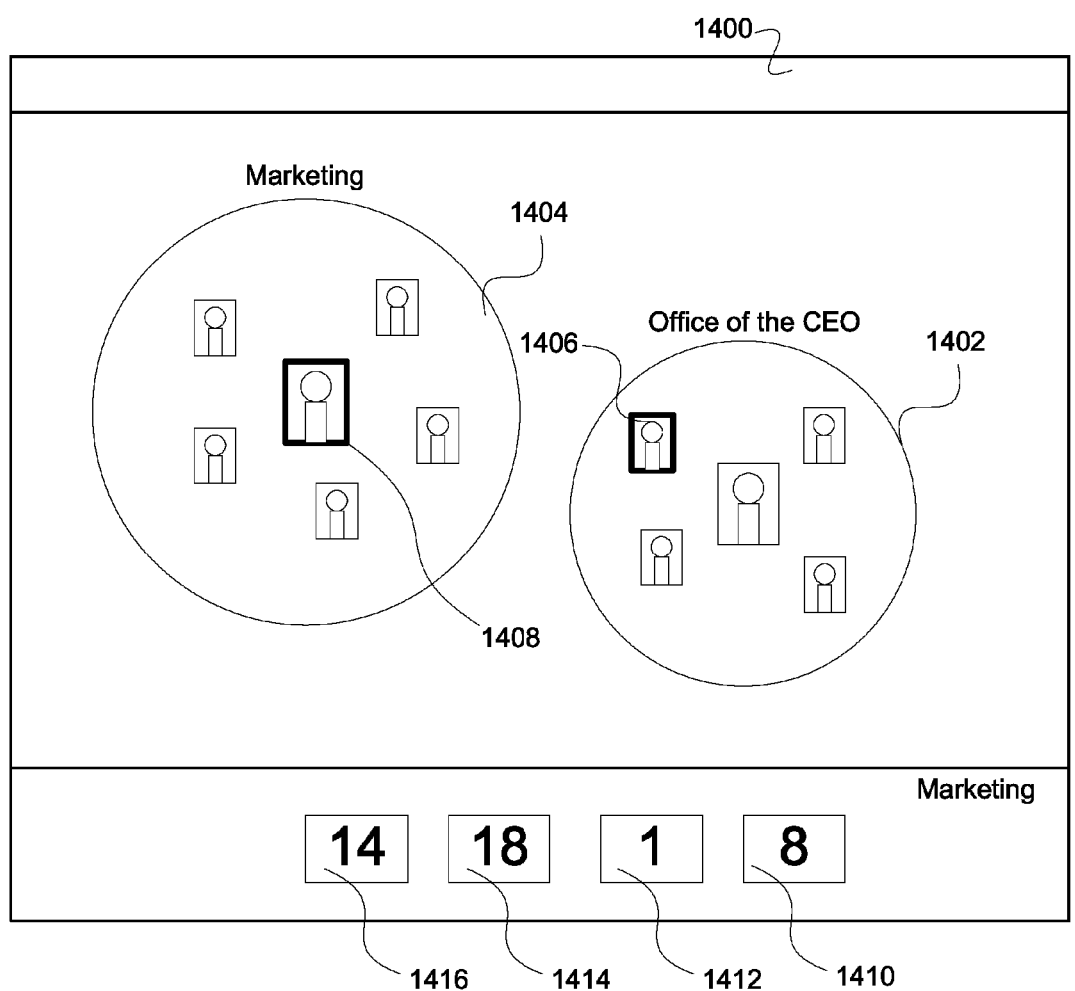
FIG. 14 is a block diagram illustrating an embodiment of a user interface display.

FIG. 14 is a block diagram illustrating an embodiment of a user interface display. In the example shown, 1400 is a user display including circle 1402 representing the office of the CEO. Circle 1402 includes 5 members with a head member in the center. Member 1406 comprises the head of circle 1404 representing marketing. Circle 1404 includes 6 members with head member 1408. Circle 1404 has focus. At the bottom of the display, marketing statistics are shown (e.g., statistic 1410, statistic 1412, statistic 1414, statistic 1416, etc.). In various embodiments, statistics comprise one or more of the following: a key performance indicator, a headcount movement, a projected headcount, a headcount budget, a headcount churn, a days to hire, performance, average performance review rating, % goal attainment, employee loyalty, employee satisfaction, turnover rate, sales, sales pipeline, sales quota, sales bookings, cost of sales, costs, average travel costs, average expense costs, deviation form budget costs, or any other appropriate statistic or information. In some embodiments, the metrics update themselves when a different group is in focus.

In some embodiments, the information displayed (e.g., the detailed information, the key performance indicators, etc.) for a current user is displayed or not displayed based at least in part on the security access privileges. For example, the user has access or not, the group associated with the user has access or not, the title or position associated with the user has access or not. In various embodiments, it is determined whether the current user has access to a given set of information (e.g., performance metrics) and if not, the set of information is not displayed or is hidden; it is determined whether the current user has access to a particular piece of information (e.g., a specific metric) and if not, the metric is hidden; it is determined whether the user has access to a particular piece of information (e.g., a specific metric) for the currently selected group and if not, display that the metric exists, but not show the metric value, or any other appropriate combination of hiding a metric, displaying a metric, showing a metric exists but not displaying a value, or any other appropriate security filtering based on the user, the user's attributes, the user's position, the user's company, or other appropriate factors. In some embodiments, a security access privilege for a user associated with the indication to display is determined and based at least in part on the security access privileges to display or not display one or more items of detailed information.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for displaying a hierarchical organization, comprising:
a processor configured to:
receive an indication to display a hierarchical organization;
cause a first group with focus at a focus level to display within a first circle, wherein the first circle includes one or more members of the first group and at least a first group head, and wherein the first group head is a member of a second group in the hierarchical organization, wherein the first group head is displayed in the middle of the first circle with the one or more members arranged radially around the first group head inside the first circle, wherein a member of the one or more members is a head of a below group and is displayed as a stack of overlapping polygons indicating the below group inside the first circle; and
cause the second group in the hierarchical organization to display within a second circle, wherein the second circle is associated with a level above the focus level of the hierarchical organization and the level above the focus level is associated with the first group head of the first group, wherein the second group comprises the first group head as a member and a second group head in the center of the second circle, wherein the second circle further comprises one or more second group members, wherein a member of the one or more second group members is a head of a group that is caused to be displayed as a stack of overlapping polygons inside the second circle;
cause a third group in the hierarchical organization to display within a third circle, wherein the third circle comprises the second group head as a member and a third group head in the center of the third circle; and
cause the first circle, the second circle, and the third circle to display simultaneously as non-concentric circles arranged offset from each other at an angle in a swirl; and
a memory coupled to the processor and configured to provide the processor with instructions.

2. A system as in claim 1, wherein the indication comprises a request to search for an individual of the hierarchical organization.

3. A system as in claim 1, wherein the indication comprises a request to display the hierarchical organization.

4. A system as in claim 1, wherein the indication comprises a selection of a selected member of a selected group of the hierarchical organization.

5. A system as in claim 4, wherein the first group with focus comprises the selected group.

6. A system as in claim 4, wherein the processor is further configured to cause detailed information to display regarding the selected member.

7. A system as in claim 4, wherein the processor is further configured to determine a security access privilege for a user associated with the indication to display and based at least in part on the security access privileges to display or not display one or more items of detailed information.

8. A system as in claim 1, wherein the indication comprises a selection of a selected group.

9. A system as in claim 8, wherein the first group with focus comprises the selected group.

10. A system as in claim 8, wherein the processor is further configured to cause detailed information to display regarding the selected group.

11. A system as in claim 10, wherein the detailed information includes key performance information.

12. A system as in claim 10, wherein the key performance information is updated automatically when the focus is changed.

13. A system as in claim 1, wherein the indication comprises a request to search for a desired member of an associated group or a desired group.

14. A system as in claim 13, wherein the first group with focus comprises the associated group or the desired group.

15. A method for displaying a hierarchical organization, comprising:
receiving an indication to display a hierarchical organization;
causing a first group with focus at a focus level to display within a first circle, wherein the first circle includes one or more members of the first group and at least a first group head, and wherein the first group head is a member of a second group in the hierarchical organization, wherein the first group head is displayed in the middle of the first circle with the one or more members arranged radially around the first group head inside the first circle, wherein a member of the one or more members is a head of a below group and is displayed as a stack of overlapping polygons indicating the below group inside the first circle;
causing the second group in the hierarchical organization to display within a second circle, wherein the second circle is associated with a level above the focus level of the hierarchical organization and the first group head is a member of the second group, wherein the second group comprises the first group head as a member and a second group head in the center of the second circle, wherein the second circle further comprises one or more second group members, wherein a member of the one or more second group members is a head of a group that is caused to be displayed as a stack of overlapping polygons inside the second circle;
causing a third group in the hierarchical organization to display within a third circle, wherein the third circle comprises the second group head as a member and a third group head in the center of the third circle; and
causing the first circle, the second circle, and the third circle to display simultaneously as non-concentric circles arranged offset from each other at an angle in a swirl.

16. A computer program product for displaying a hierarchical organization, the computer program product being embodied in a tangible and non-transitory computer readable storage medium and comprising computer instructions for:
receiving an indication to display a hierarchical organization;
causing a first group with focus at a focus level to display within a first circle, wherein the first circle includes one or more members of the first group and at least a first group head, and wherein the first group head is a member of a second group in the hierarchical organization, wherein the first group head is displayed in the middle of the first circle with the one or more members arranged radially around the first group head inside the first circle, wherein a member of the one or more members is a head of a below group and is displayed as a stack of overlapping polygons indicating the below group inside the first circle;
causing the second group in the hierarchical organization to display within a second circle, wherein the second circle is associated with a level above the focus level of the hierarchical organization and the first group head is a member of the second group, wherein the second group comprises the first group head as a member and a second group head in the center of the second circle, wherein the second circle further comprises one or more second group members, wherein a member of the one or more second group members is a head of a group that is caused to be displayed as a stack of overlapping polygons inside the second circle;

causing a third group in the hierarchical organization to display within a third circle, wherein the third circle comprises the second group head as a member and a third group head in the center of the third circle; and causing the first circle, the second circle, and the third circle to display simultaneously as non-concentric circles arranged offset from each other at an angle in a swirl.

* * * * *